(No Model.) 6 Sheets—Sheet 1.
E. DERBEC.
ORE SEPARATOR.
No. 397,070. Patented Jan. 29, 1889.
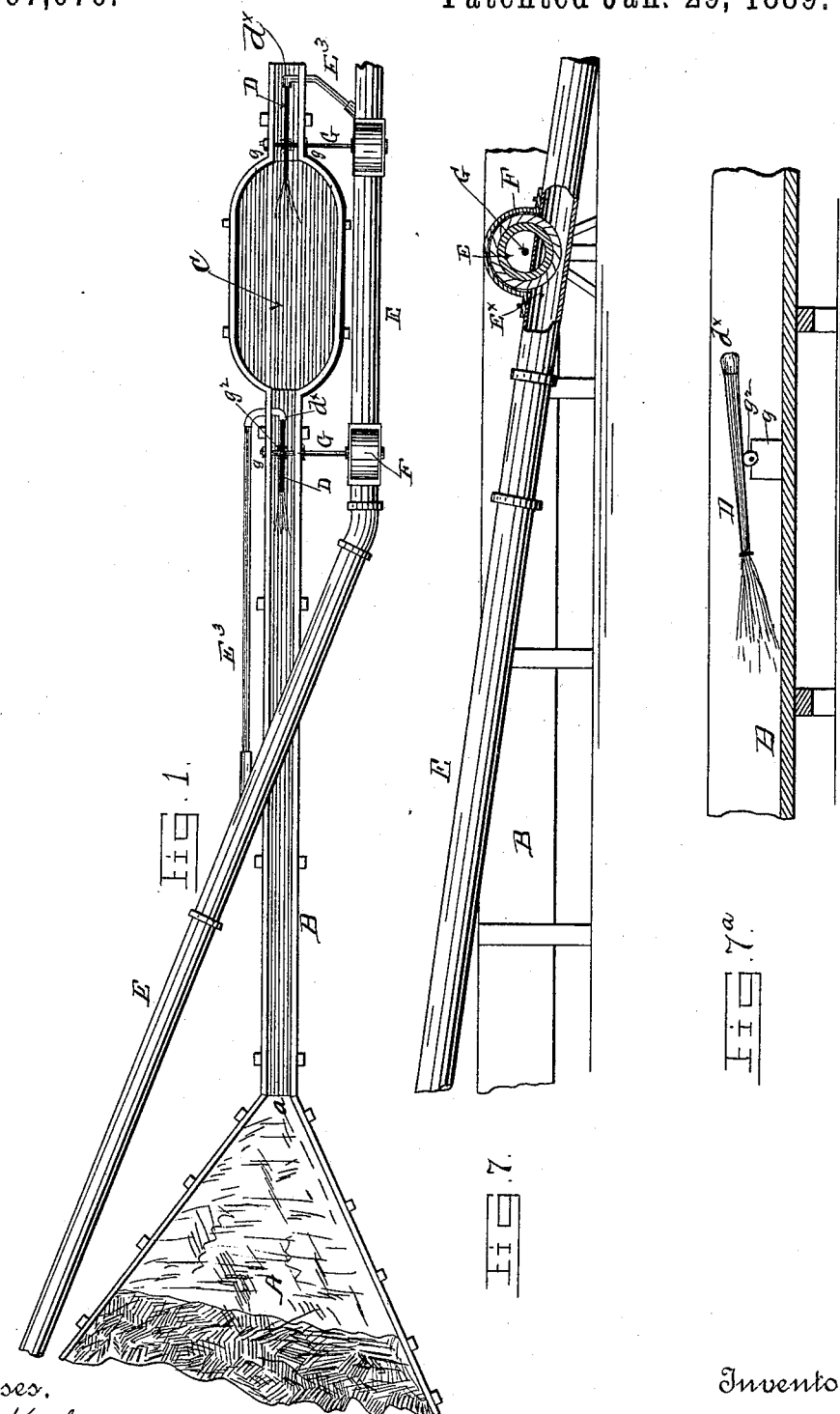
Witnesses.
Chas. S. Kalb
A. Buhrman.
Inventor
Etienne Derbec
By his Attorneys Smith & Osborn
Per J. N. Kalb, Asso.

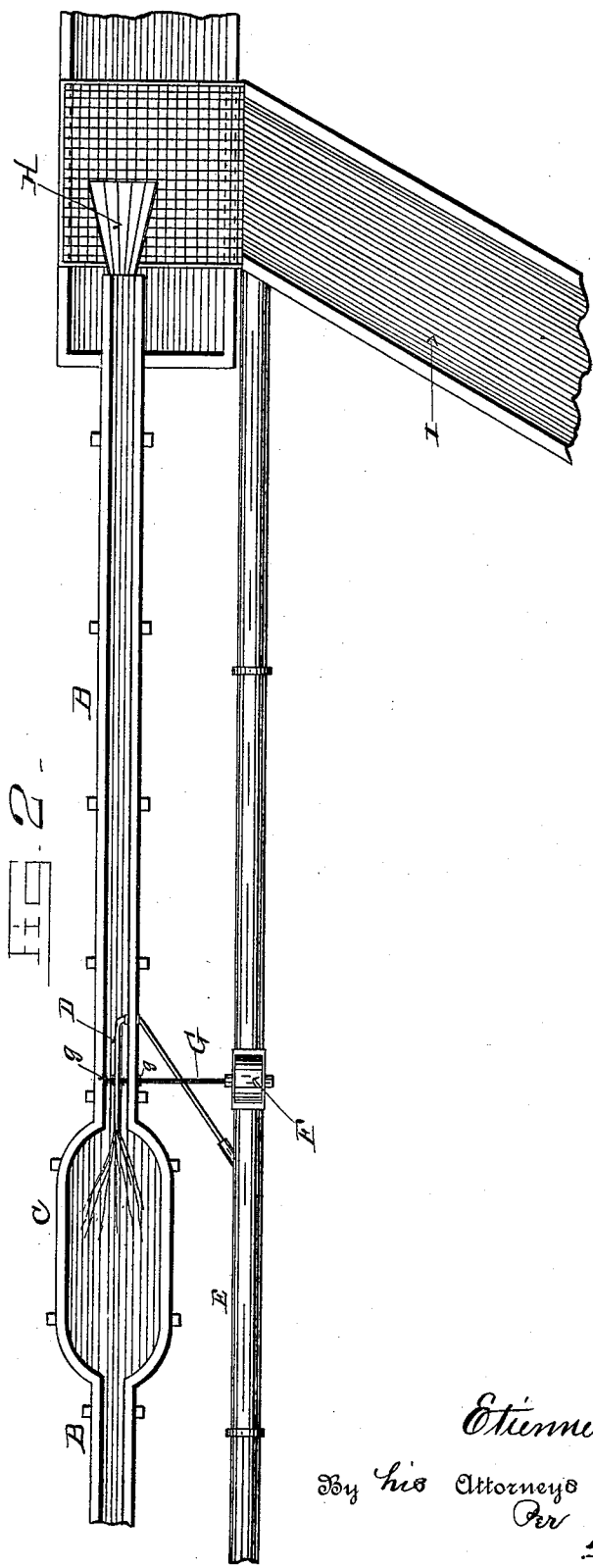

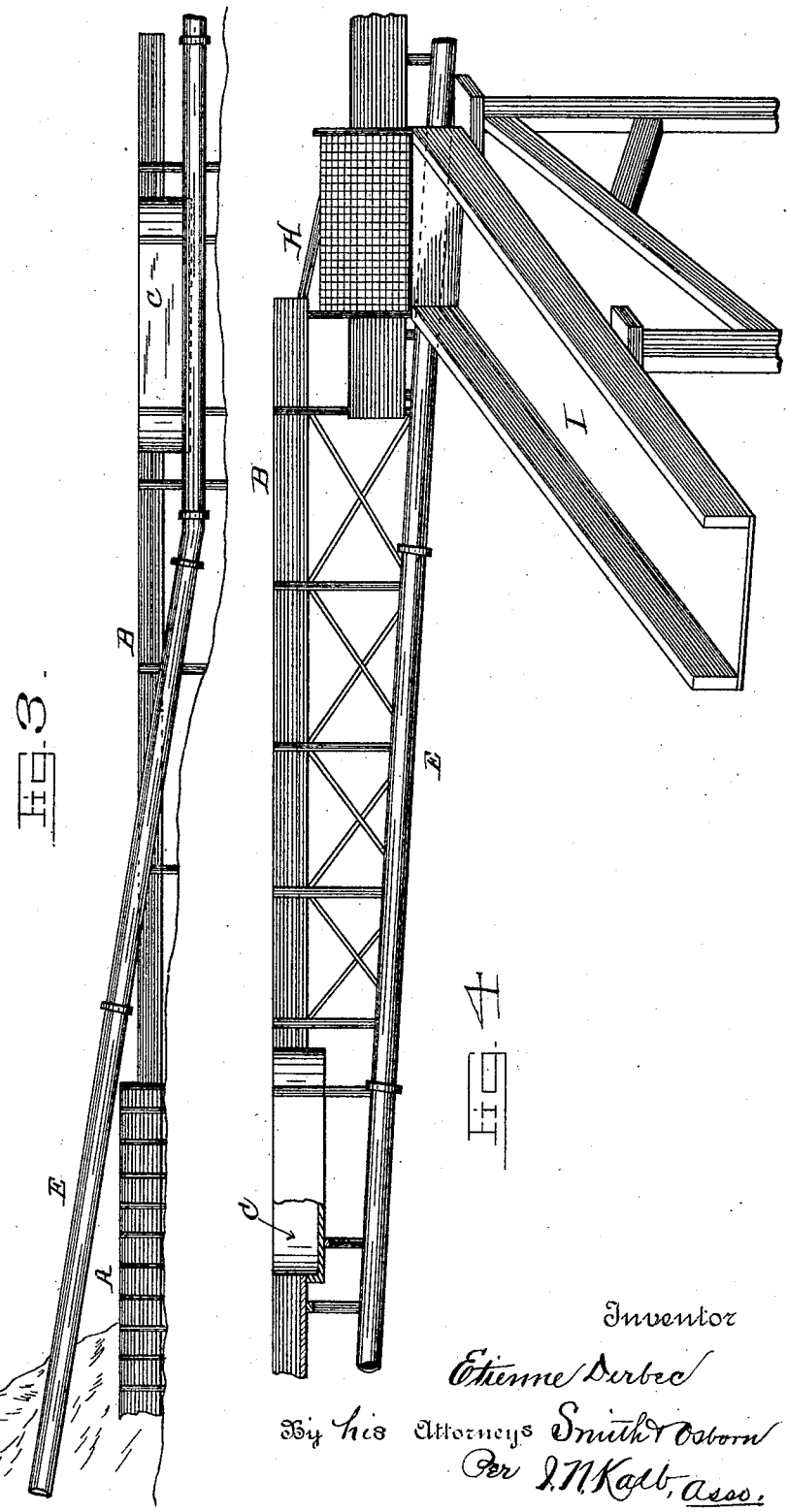

(No Model.) 6 Sheets—Sheet 4.
E. DERBEC.
ORE SEPARATOR.
No. 397,070. Patented Jan. 29, 1889.
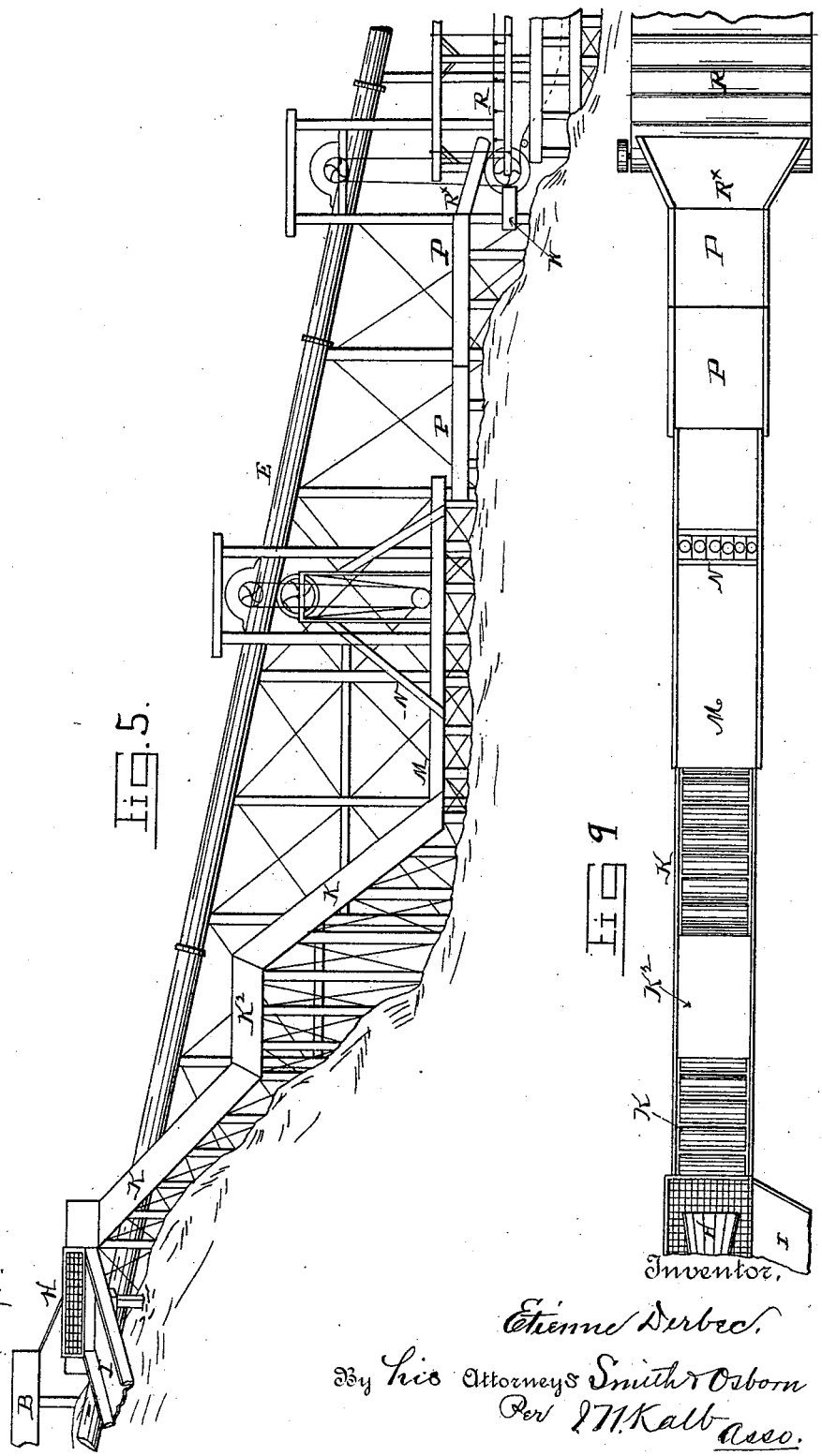

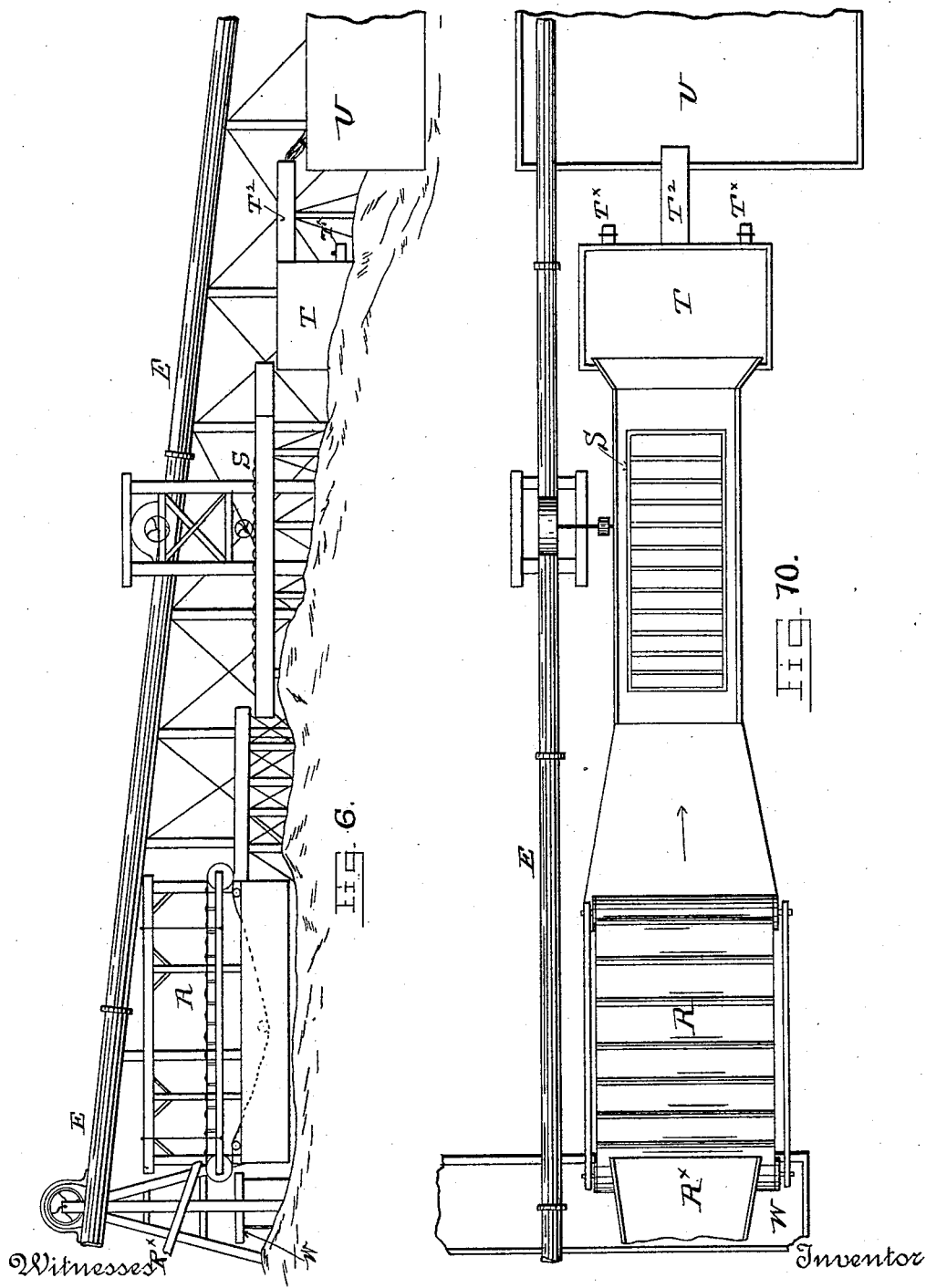

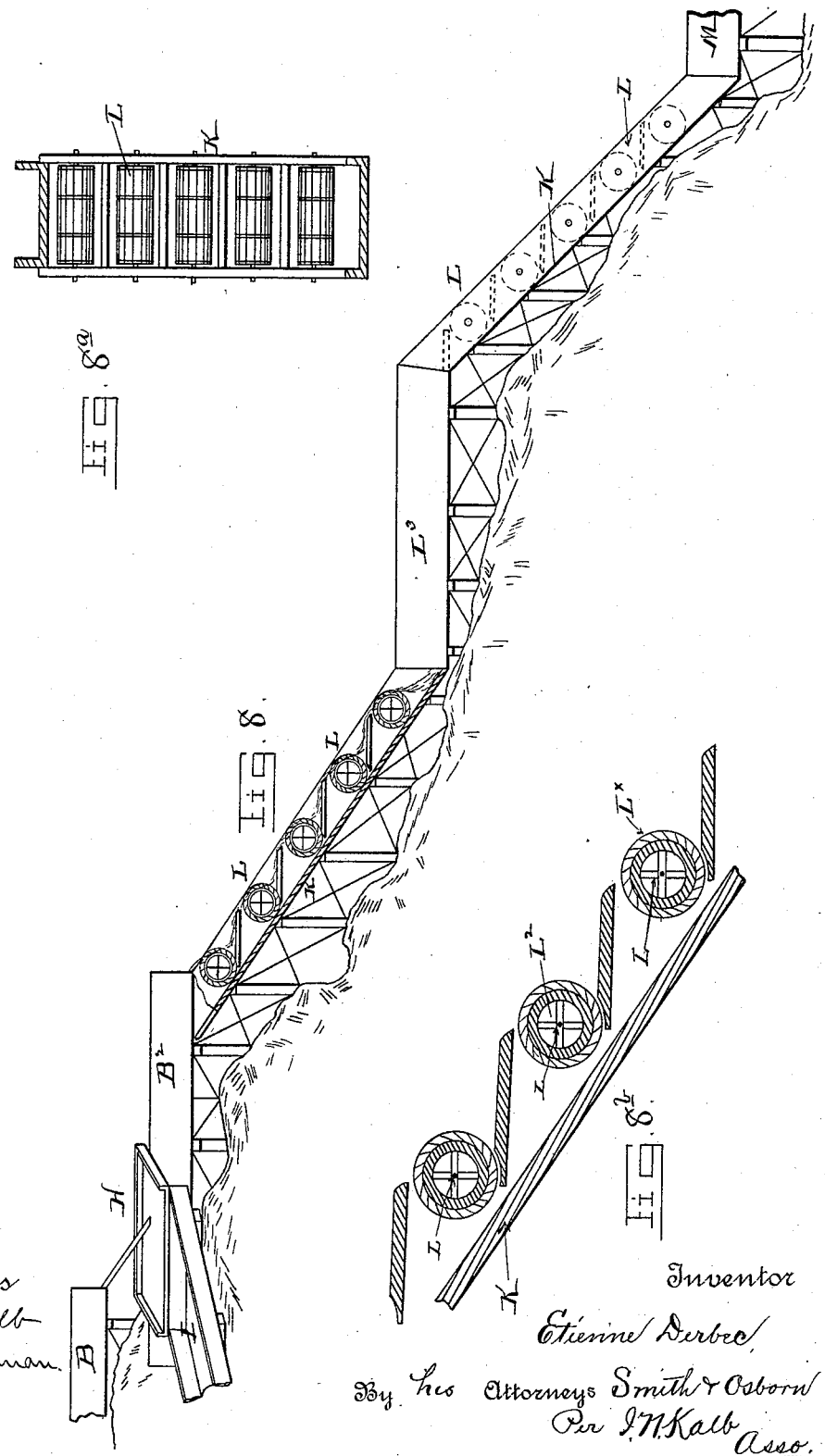

UNITED STATES PATENT OFFICE.

ETIENNE DERBEC, OF SAN FRANCISCO, CALIFORNIA.

ORE-SEPARATOR.

SPECIFICATION forming part of Letters Patent No. 397,070, dated January 29, 1889.

Application filed November 9, 1887. Serial No. 254,710. (No model.)

*To all whom it may concern:*

Be it known that I, ETIENNE DERBEC, a citizen of the Republic of France, residing in the city and county of San Francisco, and State of California, have invented certain new and useful Improvements in Ore-Separators; and I do hereby declare that the following is a full, clear, and exact description of my said invention, reference being had to the drawings that accompany and form part of this specification.

The primary object of my invention is to work auriferous gravels, cements, and other similar deposits by hydraulic means with great economy in the use of water and without the production of miners' débris, whereby I am not only enabled to materially reduce the expense of working these claims, but I remove the principal obstacle to their successful and continuous working by hydraulic means at the present time—namely, the filling up of rivers and streams with the débris and the destruction of the surrounding country for agricultural purposes.

My invention embraces a line or system of apparatus set up at the mining-claims for continuously working and operating upon the material which is brought to and caused to travel through the several parts of the system by the joint action of the water and the inclination of the sluices or conductors.

The parts or members of the system consist, first, of a line of sluice having disintegrating-basins and water-jets that act upon the material during its progress to break up and disintegrate the lumps or masses of softer character—such as cemented particles and lumps of clay; secondly, of mechanical disintegrators that, receiving the material from the sluice, act upon the harder lumps, bodies, or masses to break up and reduce them, and afterward upon the portions, bodies, or particles that are harder; thirdly, of amalgamators and concentrators to separate, concentrate, and extract such particles of metal as escape or are not susceptible to the earlier operations wherein separation is effected by gravitation, and, fourthly, of settling-reservoirs into which the water charged with the sand and other refuse matters constituting the débris is separated from such solid matter, and the water, free from sediments, is finally allowed to run off or is utilized for any desired purpose, while the solids are retained. In connection with these parts I provide and apply a motive power for running all the mechanism or parts of the apparatus that require power to work them, consisting of a line of hydraulic pipes having connection with a head of water above of suitable quantity and pressure and water-wheels set into the pipe at points along the line. From these wheels, running in and being driven by the confined water, power is transmitted by means of belts, pulleys, gears, or shafting to each apparatus or part to be driven, the wheels being located in position convenient for the purpose. This line of pipe also supplies water for the hydraulic jets in the disintegrating sluice and basins, and, by means of branches or taps, also to such parts of the apparatus as may require additional quantities of water in operating on the material passing through them.

The following description fully explains the nature of my said improvements in working mining-claims of the kinds before mentioned by hydraulic means and the manner in which I construct and arrange my system of apparatus for carrying out the various steps or operations therein, the accompanying drawings being referred to by figures and letters.

Figures 1 and 2 are views in plan, showing the head or higher portion of the apparatus, which receives the ore as it is broken down or mined from the wall or bank. This part I have termed the "disintegrating-sluice." Figs. 3 and 4 are views, partly broken away, in side elevation of Figs. 1 and 2. Fig. 5 is a continuation of the line of apparatus from the end of the sluice to the amalgamators, being that part in which the material is further disintegrated and is reduced mechanically. Fig. 6 shows the lower end portion of the apparatus in which the material receives final treatment and the solid matter is separated from the waste water. Fig. 7 is a broken side elevation of the head of the sluice and the water-pipe and wheel; and Fig. 7$^a$ is a detail in section, showing the oscillating hydraulic nozzles. Fig. 8 is an elevation, partly in section, of the inclined sluices and overshot disintegrating-wheels. Fig. 8$^a$ is a front view of a portion of one of the said sluices, and Fig. 8ᵇ is a section in detail on a larger scale. Fig. 9 is a plan of Fig. 5. Fig. 10 is a plan of Fig. 6.

Similar letters of reference indicate like parts in all the figures of the drawings.

A, Fig. 1, represents an inclosed basin or reservoir built in front of the wall or bank being worked, with converging sides and an outlet at the apex. Water is supplied to this reservoir from the source above it in sufficient quantity to assist the movements and discharge of the material from the outlet $a$ into the sluice D. This sluice, having suitable inclination, is carried in a straight line from the outlet. It is of the usual form of box-sluice, excepting that it has basins C C at intervals in its length, which are somewhat wider and deeper than the sluice itself, and are made with curved inner walls to avoid angles and pockets. Their bottoms are flat and should have riffles set across them perpendicular to the direction of the current. The following dimensions would answer well in most cases for these parts: from twenty-four to thirty-six inches for the width of the sluice, from three to five feet for the width of the basins, from three to five feet for the depth of the former, and from ten feet upward for the length of the latter.

D is a small hydraulic nozzle that is set in the sluice with the discharge end pointing toward the current and longitudinally through the space or passage-way to deliver a small but powerful jet against the advancing material. One of these jets is placed to direct its stream into the basin and others are located at intervals in the length of the sluice. A vertical oscillating movement is given to the end of the nozzle when in operation to apply the stream or jet at different depths and to act upon the advancing material through its whole depth or thickness. Power to produce these movements is obtained from the head of water that supplies the jets and other parts of the apparatus by laying a line of pipe, E, in suitable position and as close to the line of sluice and other parts of the apparatus as the nature of the ground will permit, and setting small undershot wheels $E^×$ into the pipe through openings $E^2$, which are inclosed by casings F, set over the wheels to properly confine the water. The shafts G of the wheels, being carried through the sides of the sluice in suitable bearings, $g$, have small eccentrics $g^2$ fixed on them just under the outer ends of the nozzles, upon which the nozzles are made to rest. At the rear end or butt each nozzle is swiveled at $d^×$ in the stationary conducting-pipe $E^3$, which is a branch taken from the main pipe, and moving on this joint as a center the outer end of the nozzle rises and falls in a vertical arc as the shaft G rotates. This construction and arrangement is shown in Figs. 1, 7, and 7ª of the drawings.

H is a "grizzly" or grating of iron bars at the end of the sluice, with a lateral inclination to discharge the large stones to one side, and I is a chute or waste-sluice setting under the end of the grating to catch and carry away such portions that come from it. At this point I thus remove and carry off the bodies that are too large to pass the grating and that are not of suitable character to be worked or allowed to run through the other parts of the apparatus. This return-sluice may be carried away from the line to deposit the matter at any distant point.

K K are inclined sluices, in which are set a number of overshot wheels or barrels, L, having raking paddle boards or buckets $L^×$ and set to revolve loosely on trunnions $L^2$. These wheels are arranged one below the other, with a fixed apron beneath each one to deliver the stream of water and the material coming from the end of the sluice $B^2$ above in a series of falls or cascades down the whole length of the incline over the wheels. A level break, $L^3$, may be made in the inclines, as shown in Fig. 8, and the number of inclines and wheels may be increased as the character of the material being worked may require or the conditions of the land over which the apparatus is laid may permit, it being evident that a certain degree of slope or inclination throughout the length of the line of apparatus is required. From the end of this incline the material is received in a sluice, M, that carries it at suitably slow rate of movement under a set of crushing-stamps, N. These mechanically reduce the particles that have resisted the earlier operations and bring the material into condition to be run through the concentrator R. Between the end of the battery-sluice M and the chute $R^×$, that conveys the material to the concentrator, I usually place amalgamated plates P, for the purpose of saving the float gold and such fine or invisible particles as are liable to run off with the surface current. At this part of the apparatus the material undergoes concentration, and the tailings are then further operated on to secure the best results in metal by running them through the roller-amalgamator S, and afterward into a settling tub or trough, T, containing a charge of quicksilver, with taps $T^×$ at the bottom for drawing off the amalgam, and overflow-spouts $T^2$ above.

The settling-reservoirs V at the end of the apparatus are of suitable area to take all the water that passes through the apparatus from the head and such additional quantities as are added to it at the different steps or operations, and, the solid matter being caused to settle to the bottom by the state of quietness obtained and the force of gravitation, the water is here finally separated from the débris.

The area and number of settling-reservoirs required will depend on the character of the matter being operated on and the volume of water used; but the comparatively small quantity of water that is taken directly through the sluices and parts of the apparatus and becomes charged with the sand and other matter and the fact that the great bulk of the water used passes through the pipe E and is not brought into contact with the material at all render practicable the separation of the débris by means of these reservoirs and the comparative purification of the waste water.

The concentrates discharged from the head of the endless traveling apron are received and conducted by the chute or trough W to a suitable tank or receptacle at one side, and in like manner conductors are provided under the taps at the amalgamating-tub and at other desired points along the line where the valuable metal-bearing matter is to be removed or drawn off.

It should be mentioned that the particular and detailed construction of the battery of stamps, the concentrator and amalgamator, and the motor-wheels is not given in this specification for the reason that these parts of the apparatus are described in and made the subject of separate applications for Letters Patent at the same time with this application upon the whole system of apparatus. To set up and use the particular style of each apparatus which I have illustrated herein and prefer to employ in working my improved system, the said separate specifications may be referred to. The successful operation of my system is not limited, however, by these special constructions of apparatus, as others of similar character could be substituted if found desirable or expedient.

In the operation of the apparatus as thus constructed and arranged, the gravel, cement, or material of other kind, being first mined by digging, blasting, boring, excavating, or otherwise gotten out in a suitably-reduced condition, is carried into and caused to move through the disintegrating-sluice and its basins. Here the lumps and bodies of softer character capable of yielding to the action of the hydraulic jets are broken up and reduced in their progress down the sluice and through the basins. Continuing its travel, the material is next subjected to the disintegrating action of the cascade-wheels, which, being more violent in its character, reduces such portions or particles as may have resisted reduction in the sluice. After this operation the material receives more positive reduction by passing through the battery of stamps, where the most obdurate particles are crushed and the material brought to a condition of fineness suitable to undergo the subsequent operations which are employed to insure the extraction and recovery of the small light particles of metal—such as float-gold, invisible gold, rust-gold, and other like forms or conditions of the metals that are generally carried off and lost in the débris. These several steps and operations in my system of apparatus are rendered practicable by the comparatively small quantities of water used, which feature, it should be noticed, also renders it possible to remove the residue, sediments, or débris from the waste water at the end of the operations, and therefore to work mining-claims successfully by hydraulic means without damage to the surrounding country.

Having thus fully described my invention, what I claim, and desire to secure by Letters Patent, is—

1. The herein-described ore-separator, consisting of the reservoirs A, sluice B, sluice K, having cascade-wheels, reduction-mill N, concentrator R, amalgamator S, settling-tub T, settling-reservoir V, and the line of hydraulic pipe E, having motor-wheels $E^x$, and branches or taps $E^3$, supplying water to the apparatus at desired points, all arranged and combined for operation substantially as set forth.

2. In an ore-separator, a line of sluice and a line of hydraulic pipe, as E, having incased motor-wheels for supplying power to operate various apparatus at points along the line or system, substantially as described.

In testimony that I claim the foregoing I have hereunto set my hand and seal.

ETIENNE DERBEC. [L. S.]

Witnesses:
C. W. M. SMITH,
H. A. COBB.